United States Patent [19]
Nakamura

[11] Patent Number: 5,900,958
[45] Date of Patent: May 4, 1999

[54] INFRARED RAY COMMUNICATION APPARATUS

[75] Inventor: Noriyasu Nakamura, Tokyo, Japan

[73] Assignee: NEC Corporation, Tokyo, Japan

[21] Appl. No.: 08/797,571

[22] Filed: Feb. 7, 1997

[30] Foreign Application Priority Data

Feb. 9, 1996 [JP] Japan .................................. 8-023527

[51] Int. Cl.$^6$ .................................................. H04B 10/00
[52] U.S. Cl. .......................... 359/159; 359/152; 359/169
[58] Field of Search ..................................... 359/152, 159, 359/169–170, 172

[56] References Cited

U.S. PATENT DOCUMENTS 4,088,884  5/1978  Rast et al. ................................ 359/159
4,939,793  7/1990  Stewart .................................... 359/170

FOREIGN PATENT DOCUMENTS 62-201325   9/1987  Japan .
2074313    10/1981  United Kingdom .
2298753     9/1996  United Kingdom .

*Primary Examiner*—Kinfe-Michael Negash
*Attorney, Agent, or Firm*—Scully, Scott, Murphy and Presser

[57] ABSTRACT

A communication apparatus using infrared rays (IR) and capable of receiving an IR signal without regard to its orientation is disclosed. An IR signal incident to the apparatus is transmitted through an IR signal inlet implemented by a one-way mirror. Subsequently, the IR signal is sequentially reflected by reflectors and the IR signal inlet to reach an IR signal receiving portion.

7 Claims, 4 Drawing Sheets

INFRARED RAY COMMUNICATION APPARATUS

BACKGROUND OF THE INVENTION

The present invention relates to a communication apparatus and, more particularly, to a communication apparatus of the type interchanging data signals by use of infrared rays.

A infrared ray (IR) communication apparatus capable of interchanging IR signals is extensively used today. This type of communication apparatus has an IR signal transmitting/receiving portion for transmitting or receiving an IR signal, as needed. The prerequisite with the IR communication apparatus is that the transmitting/receiving portion be accurately aligned with the transmitting/receiving portion of the other communication apparatus during communication. Should the transmitting/receiving portions of the two apparatuses not exactly face each other, the apparatuses would fail to interchange the IR signal Technologies relating to the present invention are taught in, e.g., Japanese Patent Laid-Open Publication No. 62-201325.

SUMMARY OF THE INVENTION

It is therefore an object of the present invention to provide an IR signal communication apparatus capable of receiving an IR signal without regard to its orientation relative to a direction in which the IR signal arrives.

An IR communication apparatus of the present invention includes a first portion for transmitting an IR signal incident to the apparatus from the outside while reflecting the IR signal incident to the first portion from the inside. A second portion reflects the IR signal transmitted through the first portion. An IR signal receiving portion receives the IR signal sequentially reflected by the first and second portions.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
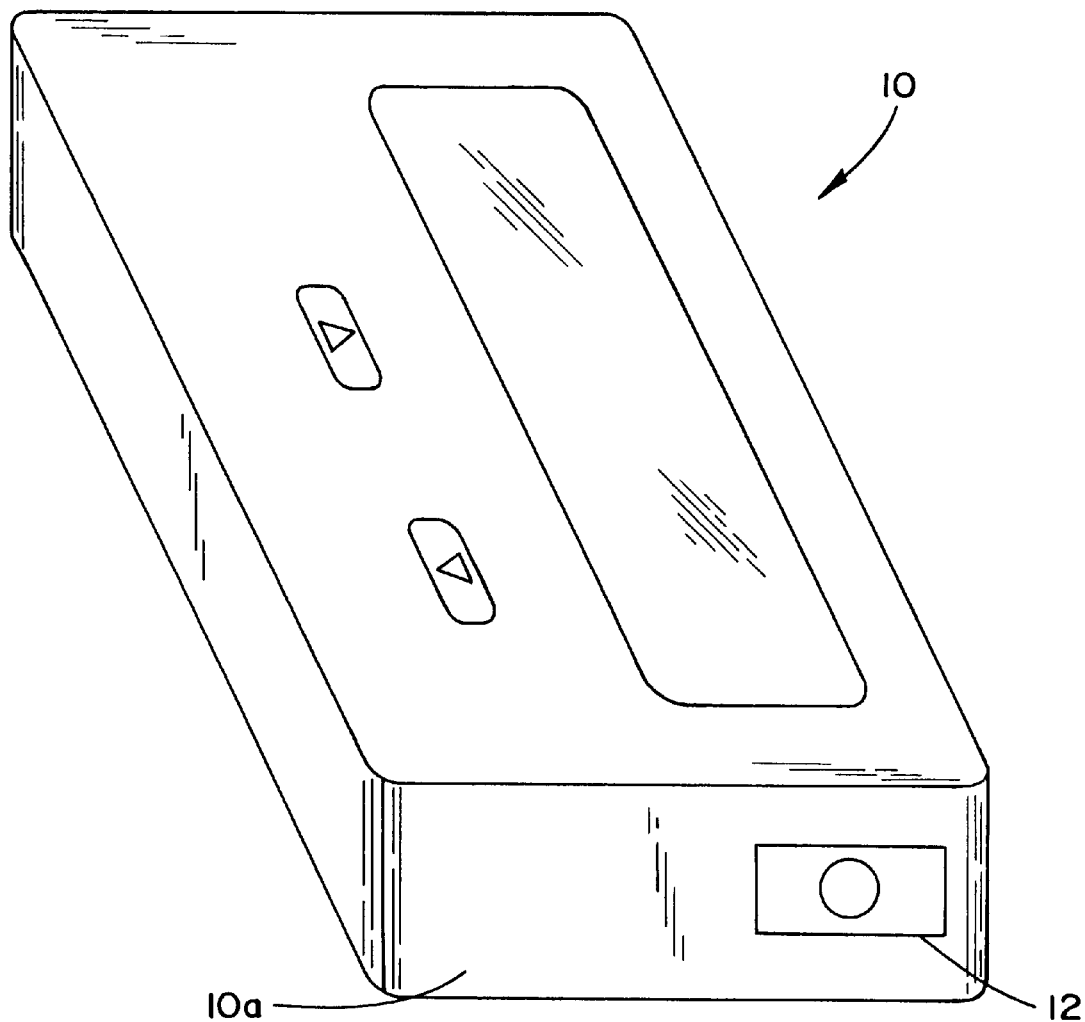
FIG. 1 is an external perspective view of a conventional IR signal communication apparatus.

To better understand the present invention, brief reference will be made to a conventional IR signal communication apparatus, shown in FIG. 1. As shown, the apparatus is implemented as an IR signal receiver 10 by way of example. The receiver 10 has an IR receiving portion 12 on its one side 10a. During communication, the receiver 10 is positioned such that the side 10a with the receiving portion 12 is oriented in a direction in which an IR signal sent from the other IR signal communication apparatus arrives. The prerequisite with the receiver 10 is that the side 10a with the IR receiving portion 12 be accurately oriented in the above direction, resulting in troublesome manipulation, as stated earlier.

Figure 2A:
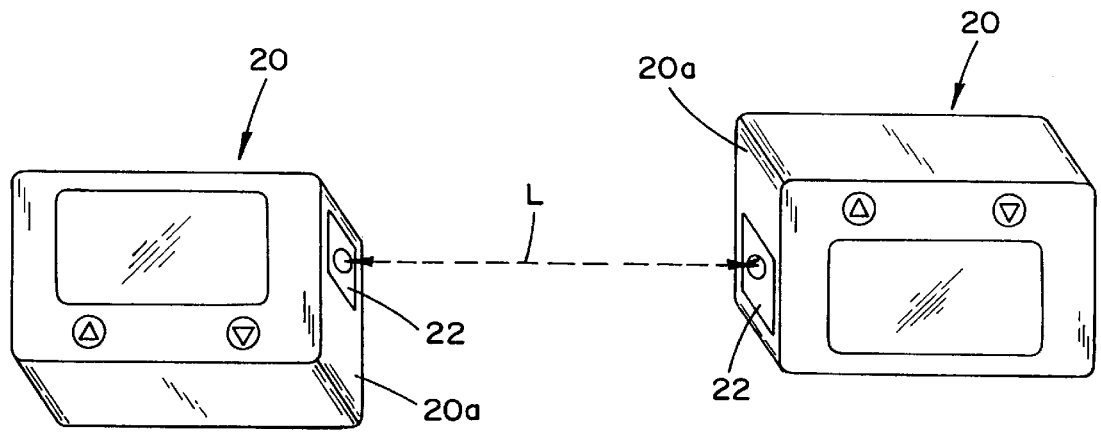
FIGS. 2A and 2B each shows a specific condition of IR signal interchange between conventional IR signal communication apparatuses.
Figure 2B:
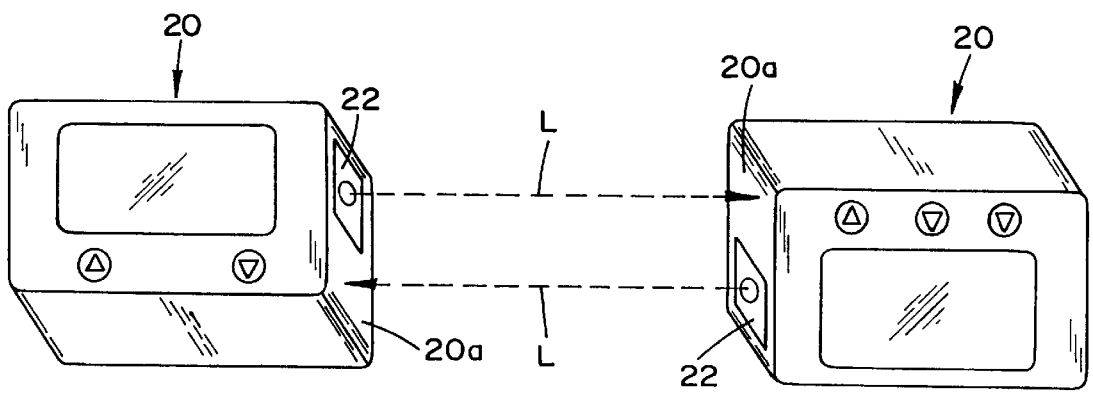

FIGS. 2A and 2B show conventional IR signal communication apparatuses implemented as IR signal transceivers 20. As shown, the transceivers 20 each has an IR transmitting/receiving portion 22 and interchanges an IR signal L with the other transceiver 20. During communication, the transceivers 20 must also be positioned such that their sides having the transmitting/receiving portions 22 align with each other. Specifically, as shown in FIG. 2A, so long as the transmitting/receiving portions 22 of the transceivers 20 face each other, the transceivers 20 can interchange the IR signal L with each other. However, as shown in FIG. 2B, when the transmitting/receiving portions 22 do not accurately face each other, the transceivers 20 are prevented from interchanging the IR signal L.

Figure 3:
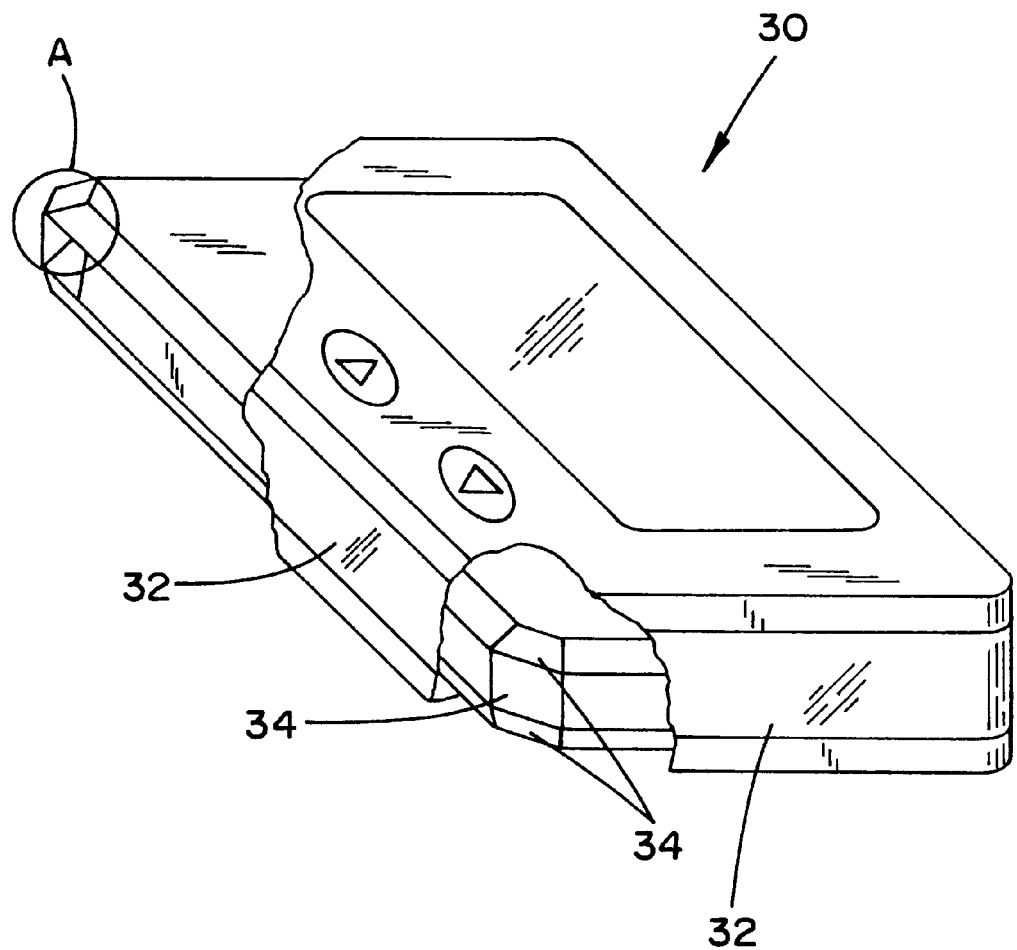
FIG. 3 is a partly taken away perspective view showing an IR signal communication apparatus embodying the present invention.
Figure 4:
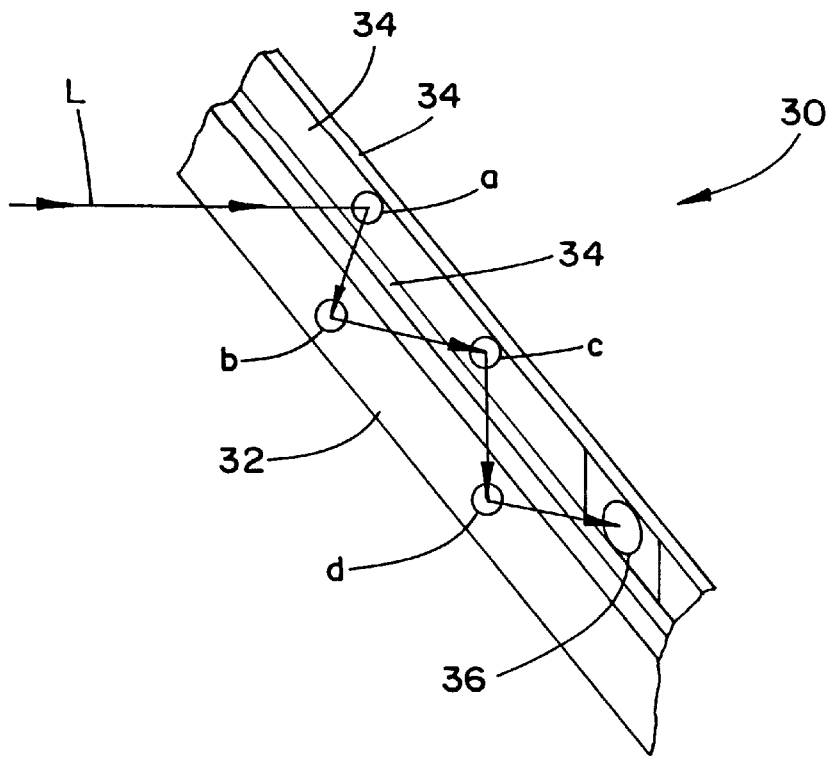
FIG. 4 is a fragmentary perspective view showing how an IR signal reaches an IR signal receiving portion included in the embodiment.

Referring to FIG. 3, an IR signal communication apparatus embodying the present invention is shown and implemented as an IR signal receiver by way of example. As shown, the IR receiver, generally 30, has an IR signal inlet 32 extending along all the sides as distinguished from opposite major surfaces. The IR signal inlet 32 is constituted by a one-way mirror. Reflectors 34 are formed along the inner periphery of the receiver 30 in parallel to the signal inlet 32. The reflectors 34 located at the corners of the receiver 30 are chamfered, as indicated by letter A by way of example. As shown in FIG. 4, an IR signal receiving portion 36 is formed in a part of the reflectors 34.

The operation of the receiver 30 will be described with reference to FIGS. 3 and 4. An IR signal L arrived at the receiver 30 enters the receiver 30 by being transmitted through the signal inlet 32. Then, the signal L is sequentially reflected by the signal inlet 32 and reflectors 34 until it reaches the signal receiving portion 36. Specifically, as shown in FIG. 4, assume that the signal L transmitted through the signal inlet 32 is incident to a point a on one of the reflectors 34. Then, the signal L is reflected by the point a, and then reflected by a point b on the signal inlet or one-way mirror 32. Further, the signal L reflected by the point b is reflected by a point c on the above reflector 34, and then reflected by a point d on the signal inlet 32. As a result, the signal L is incident to the signal receiving portion 36.

In the above specific case, the signal L is assumed to be incident to one side of the receiver 30 where the signal receiving portion 36 is present. Even when the signal L is incident to any other side of the receiver 30 where the signal receiving portion 36 is absent, the signal L can turn round to the signal receiving portion 36 because the reflectors 34 at the corners are chamfered.

Figure 5:
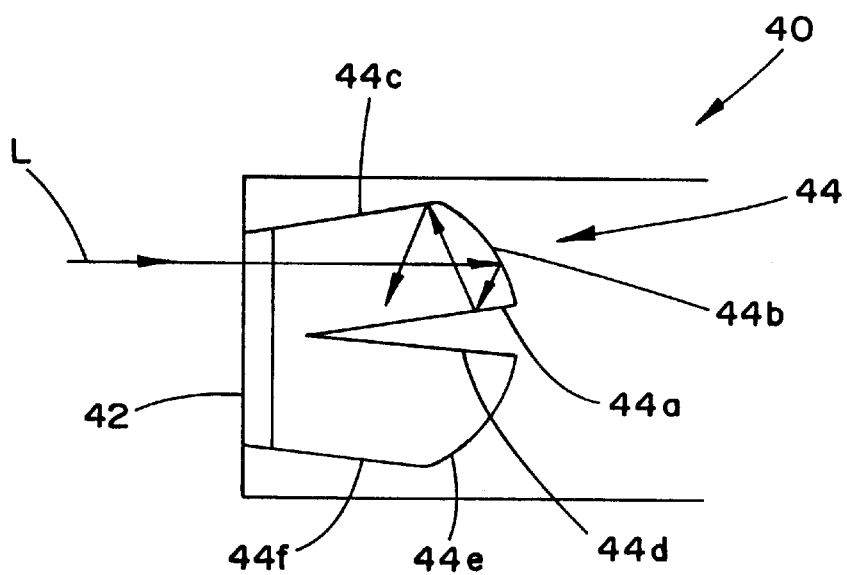
FIG. 5 is a fragmentary section showing an alternative embodiment of the present invention.

FIG. 5 shows an alternative embodiment of the present invention also implemented as an IR signal receiver. As shown, the receiver, generally 40, has an IR signal inlet 42 and a reflector 44 made up of a first to a sixth reflector 44a–44f. The reflectors 44a–44f cooperate to reflect the IR signal L incident to the receiver 40. The second and fifth reflectors 44b and 44e furthest from the signal inlet 42 each has a parabolic configuration. The first and fourth reflectors 44a and 44d are positioned at the focal points of the reflectors 44b and 44e, respectively. The third and sixth reflectors 44c and 44f are parallel to the reflecting surfaces of the reflectors 44a and 44d, respectively. With this configuration, the receiver 40 is capable of reflecting the input signal L more efficiently than the receiver 30.

In operation, the IR signal L entering the receiver 40 is reflected downward by, e.g., the second reflector 44b because the reflector 44b has a parabolic surface. The signal L so reflected by the reflector 44b is reflected by the first reflector 44a located at the focal point of the reflector 44b. The signal L reflected by the reflector 44a is further reflected by the third reflector 44c parallel to the reflector 44a. Finally, the signal L reaches a signal receiving portion, not shown, formed on, e.g., the first reflector 44a.

If desired, the receiver 30 or 40 may additionally be provided with an IR signal emitting portion for sending an IR signal. In such a transceiver configuration, the one-way mirror will not be formed at a part of the signal inlet which should transmit the IR signal to be emitted.

In summary, it will be seen that the present invention provides an IR signal communication apparatus capable of receiving an IR signal without regard to its orientation. This is because an IR signal incident to the apparatus is transmitted through an IR signal inlet implemented by a one-way mirror and then sequentially reflected by reflectors and the IR signal inlet.

Various modifications will become possible for those skilled in the art after receiving the teachings of the present disclosure without departing from the scope thereof. For example, the IR signal receiving portion may be located at any desired position on the reflector, and even the number of such IR signal receiving portions is open to choice. Further, the configuration of the reflectors shown and described is only illustrative.

What is claimed is:

1. An infrared ray (IR) communication apparatus comprising:

first means having an outer and inner surface for transmitting an IR signal incident to said outer surface and for reflecting an IR signal incident to said inner surface;

second means for sequentially reflecting the IR signal transmitted through said outer surface of said first means between said inner surface of said first means and said second means and for directing the IR signal to a predetermined location; and IR signal receiving means disposed at the predetermined location for receiving the directed and sequentially reflected IR signal.

2. An apparatus as claimed in claim 1, wherein said first means comprises a one-way mirror.

3. An apparatus as claimed in claim 2, wherein said first means extends along all sides of said apparatus.

4. An apparatus as claimed in claim 1, wherein said second means comprises a reflector.

5. An apparatus as claimed in claim 1, wherein said second means is located at a corner of said apparatus.

6. An apparatus as claimed in claim 5, wherein said second means is chamfered.

7. An infrared ray (IR) communication apparatus comprising:

first means having an outer surface for transmitting an IR signal incident to said outer surface;

second means comprising a first reflecting portion having a parabolic surface furthest from said first means, a second reflector portion located at a focal point of said first reflector portion, and a third reflector portion parallel to said second reflector portion; and IR signal receiving means disposed at one of the first, second, or third reflector portions for receiving the directed IR signal.

* * * * *